United States Patent [19]
Hoying et al.

[11] Patent Number: 4,991,826
[45] Date of Patent: Feb. 12, 1991

[54] HYDRAULIC MOUNT WITH VOLTAGE CONTROLLED FLUID

[75] Inventors: John F. Hoying, Bellbrook; Daniel G. Abels, Fort Recovery, both of Ohio

[73] Assignee: General Motors Corporation, Detroit, Mich.

[21] Appl. No.: 415,698

[22] Filed: Oct. 2, 1989

[51] Int. Cl.$^5$ ............................................. F16F 9/50
[52] U.S. Cl. ................................ 267/140.1; 267/219
[58] Field of Search ................ 267/140.1, 219, 34, 267/218; 188/267, 322.5; 180/300, 312, 902; 248/550, 636, 638, 562

[56] References Cited

U.S. PATENT DOCUMENTS

| | | | |
|---|---|---|---|
| 4,588,173 | 5/1986 | Gold et al. | 267/140.1 |
| 4,650,170 | 3/1987 | Fukushima | 267/140.1 |
| 4,742,998 | 5/1988 | Schubert | 267/136 |
| 4,757,981 | 7/1988 | Härtel | 267/140.1 |
| 4,759,534 | 7/1988 | Härtel | 267/140.1 |
| 4,773,632 | 9/1988 | Härtel | 267/140.1 |
| 4,783,062 | 11/1988 | Hamberg et al. | 267/140.1 |
| 4,789,143 | 12/1988 | Smith et al. | 267/140.1 |
| 4,861,006 | 8/1989 | Takano et al. | 267/140.1 |
| 4,869,477 | 9/1989 | Hoying et al. | 267/140.1 |
| 4,880,216 | 11/1989 | Härtel et al. | 267/140.1 |
| 4,893,800 | 1/1990 | Tabata | 188/267 X |

FOREIGN PATENT DOCUMENTS 0270843 11/1987 Japan ................................ 267/140.1

Primary Examiner—Douglas C. Butler
Attorney, Agent, or Firm—R. L. Phillips

[57] ABSTRACT

The hydraulic mount assembly is disclosed having a partition forming two hydraulic chambers. A primary chamber is formed by an elastomeric member and a second chamber by a resilient diaphragm. The partition is formed by a pair of plates that define an intermediate cell between the chambers. The partition plates are both formed of conductive material and are connected by a conductor to ground potential. An intermediate plate of conducting material is mounted between the plates within the cell on spaced insulating pads. Preferably, the intermediate plate includes a peripheral skirt extending toward a cooperating continuous channel formed in one of the partition plates so as to form a dome with increased surface area and a tortuous pathway for the flow of fluid through the cell between the primary and secondary chambers. The plates are connected to a control circuit including a system controller with transducers that sense the operating conditions of the vehicle. The system controller is connected to a voltage source so that a voltage potential may be applied between the intermediate plate and the partition plates. This potential may be infinitely varied to modulate the viscosity of the electro-rheological fluid within the chambers of the mount. In this way the damping characteristics of the mount are adjusted to provide the desired balance between vibration isolation and engine and/or transmission movement control under any operating conditions.

3 Claims, 1 Drawing Sheet

HYDRAULIC MOUNT WITH VOLTAGE CONTROLLED FLUID

TECHNICAL FIELD

The present invention relates generally to hydraulic mounts for vibration damping and more particularly, to a hydraulic mount assembly wherein the viscosity of the fluid is changed to vary the damping characteristics.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al, issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accommodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other communicating with the secondary chamber. The orifice track provides the hydraulic mount assembly with another passive tuning component and when combined with the freely floating decoupler, provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly, a high level of damping force and smoothing action. The high inertia of the hydraulic fluid passing through the orifice track contributes to the relatively hard mount characteristics in this mode that serve to control engine movements.

As a third (intermediate) operational mode of the mount, medium amplitude inputs produce a lower velocity of fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the relatively soft and hard operational modes.

More recent developments in hydraulic mount technology have led to the advent of electronic control of the damping characteristics of the mount. Such a hydraulic mount is disclosed in the U.S. Pat. No. 4,789,143 issued Dec. 6, 1988, assigned to the assignee of the present invention. This prior invention represents an improvement over previous mounts in that it provides variable damping levels in response to sensed vehicle operating conditions. This active tuning of the mount is clearly a more sophisticated approach and has found general acceptance among engineers and others as an advance in the art. The tuning is actually accomplished by the use of an infinitely variable sliding gate for selectively varying the size of the opening to the orifice track between the two chambers. By varying the opening size, the flow of damping fluid and thus the damping action of the mount may be changed.

Another approach to active tuning involves providing an inflatable bellows in the primary chamber of the mount. This type of approach is disclosed in United States pending patent application Ser. No. 240,668, filed Sept. 6, 1988, now U.S. Pat. No. 4,869,477 and entitled "Hydraulic Engine Mount with Air Bellows Tuning". Transducers and an electronic controller regulate the flow of air into and out of the bellows in order to control the damping effect of the mount.

Not only have these prior art mounts with active control proven to be successful in further modulating the response of the mount to vehicle operating conditions, but they can be programmed to operate in a manner particularly adapted to the vehicle configuration and the particular component being damped.

An alternative approach to active tuning is the subject matter of another U.S. Pat. No. 4,742,998, Schubert, issued May 10, 1988. In this approach, a pair of conductive plates form the partition and are impressed with an electrical potential so as to control the flow of electro-rheological fluid between the chambers. The plates of the partition are closely spaced and include a plurality of small flow apertures. Some modulation of damping is possible; however, the effectiveness and capacity is limited and improvement, especially in the flow pattern of the fluid is desirable.

SUMMARY OF THE INVENTION

Accordingly, it is a primary object of the present invention to provide an actively tunable hydraulic mount assembly overcoming the above-described limitations and disadvantages of the prior art active tuning mount assemblies.

It is another object of the present invention to provide a mount assembly that is actively tunable utilizing a characteristic of the fluid for control. It is another object of the present invention to provide a mount assembly that is actively tunable providing improved instantaneous damping control in response to sensed vehicle operation conditions.

Yet another object of the invention is to provide a mount assembly providing infinitely variable damping control by direct electrical control and providing increased flow capability and electro-fluid activation allowing installation in a number of different vehicles while providing effective and efficient operation across all reasonably anticipated operating conditions.

Still another object of the present invention is to provide an improved hydraulic mount assembly utilizing electro-rheological fluid in an improved and more efficient flow pattern through the partition of the mount assembly.

Another object of the present invention is to provide a hydraulic mount assembly that provides active and substantially instantaneous damping control without the utilization of moving mechanical components but features comparable operation characteristics.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved hydraulic mount assembly is provided to dampen and isolate engine and/or transmission vibrations during vehicle operation.

The mount assembly selected to illustrate the invention includes a pair of mounting members connected to each other through a hollow elastomeric body. This hollow body is closed by a resilient diaphragm so as to form a cavity for receiving damping fluid. In accordance with the teachings of the present invention the preferred fluid is an electro-rheological liquid. The viscosity of such a fluid is altered through the application of a voltage potential. It is through this principle of electro-fluid action that the damping modulations are imposed on the hydraulic mount assembly.

A partition in the body is provided to divide the fluid-filled cavity into two distinct chambers. A primary chamber is formed between the partition and the interior wall of the hollow body. A secondary chamber is formed between the partition and the interior wall of the diaphragm.

According to an important aspect of this invention, the partition includes upper and lower conductive plates. A cell or compartment is formed between these plates. Each plate further includes an enlarged fluid flow orifice in the center connecting the two chambers through the cell. Passage of the fluid through the orifices is operative to effect damping. The fluid is subject to physical change in a unique way to accomplish the modulation in damping.

A conductive intermediate plate forms an integral part of the partition and is mounted in the cell between the upper and lower plates. More particularly, the intermediate plate is mounted upon spaced pads of insulating material supported by at least one of the upper or lower plates of the partition. A direct current (DC) circuit is provided for applying a voltage potential to the electro-rheological fluid. More particularly, the intermediate plate and the upper and lower plates serve as polarizing plates with opposite electrical potential. For example, the upper and lower plates of the partition may be connected to negative or ground potential which sets its voltage to zero. The intermediate plate may be connected to a positive potential through a system controller of the circuit. This system controller is also connected to sensors which monitor operating parameters, such as engine vibrations and movement.

For example, during hard acceleration, the engine undergoes large amplitude vibrations. These large amplitude vibrations are detected by sensors which send appropriate input signals to the system controller. In response to these input signals, the system controller produces a command signal which causes a voltage potential of approximately, for example, 500 to 1,000 volts to be applied to the electro-rheological fluid across the intermediate plate and the upper and/or lower plates of the partition. This voltage potential causes the fluid within the cell to thicken thereby increasing the friction as the fluid moves from the primary chamber through the cell around the intermediate plate to the secondary chamber. Damping is accordingly increased so as to provide control of engine movements.

Advantageously, due to the construction of the cell with the intermediate plate being substantially surrounded by the partition plates of opposite polarity, the voltage field effect is increased. Also, improved fluid flow provides better fluid contact with the plates Thus, higher damping rates are achievable at lower voltage potentials. Consequently, more efficient operation is achieved.

During engine idling, the engine undergoes small amplitude vibrations. Again, these vibrations are detected by the input sensors which send appropriate input signals to the system controller. In response to these input signals, the system controller produces a control signal resulting in the application of minimum voltage potential across the intermediate and partition plates. As a result, the viscosity of the fluid is decreased. By design, the gap between the plates and the fluid flow orifices in the upper and lower plates are sufficiently large so that essentially no damping occurs during movement of the fluid between the primary and secondary chambers when the fluid is at this relatively low viscosity. Accordingly, the mount exhibits relatively soft characteristics and engine vibrations are effectively isolated.

Of course, it should be appreciated that by infinitely varying the voltage potential applied across the plates, the viscosity of the fluid may be infinitely varied in accordance with sensed operating conditions to provide the desired balance between isolation and control under substantially any operating conditions. A smooth transition between soft and hard characteristics is also achieved by this new design. Fine tuning is achieved through the analog-type controller.

In accordance with a further aspect of the present invention, the intermediate conductive plate is substantially continuous. The plate also includes a skirted marginal edge about its periphery so as to form a dome shape. In this way the flow path area between the plates is increased without increasing the perimeter expanse. Thus, the size of the mount may be minimized.

A substantially continuous channel is also provided around the perimeter of one of the outer plates of the partition. The size and depth of the channel corresponds to the offset extent of the skirt around the marginal edge of the intermediate plate so that the intermediate plate is substantially the same distance (from 0.5–7.0 and preferably 3.0 millimeters) from both outer partition plates over its entire surface. Advantageously, the skirt and mating channel also serve to provide a tortuous pathway for the flow of the electro-rheological fluid. In fact, the pathway effectively provides a fluid churning effect that maximizes the contact area of the plates with the fluid. In this way, more efficient and effective operation of the system is possible.

Still other objects of the present invention will become apparent to those skilled in this art from the following description wherein there is shown and described a preferred embodiment of this invention, simply by way of illustration of one of the modes best suited to carry out the invention. As will be realized, the invention is capable of other different embodiments and its several details are capable of modification in various, obvious aspects all without departing from the invention. Accordingly, the drawings and description will be regarded as illustrative in nature and not as restrictive.

BRIEF DESCRIPTION OF THE DRAWING

The accompanying drawing, incorporated in and forming a part of the specification, illustrates several aspects of the present invention and together with the description serves to explain the principles of the invention. In the drawing.

Reference will now be made in detail to the present preferred embodiment of the invention an example of which is illustrated in the accompanying drawing.

DETAILED DESCRIPTION OF THE INVENTION

Figure 1:
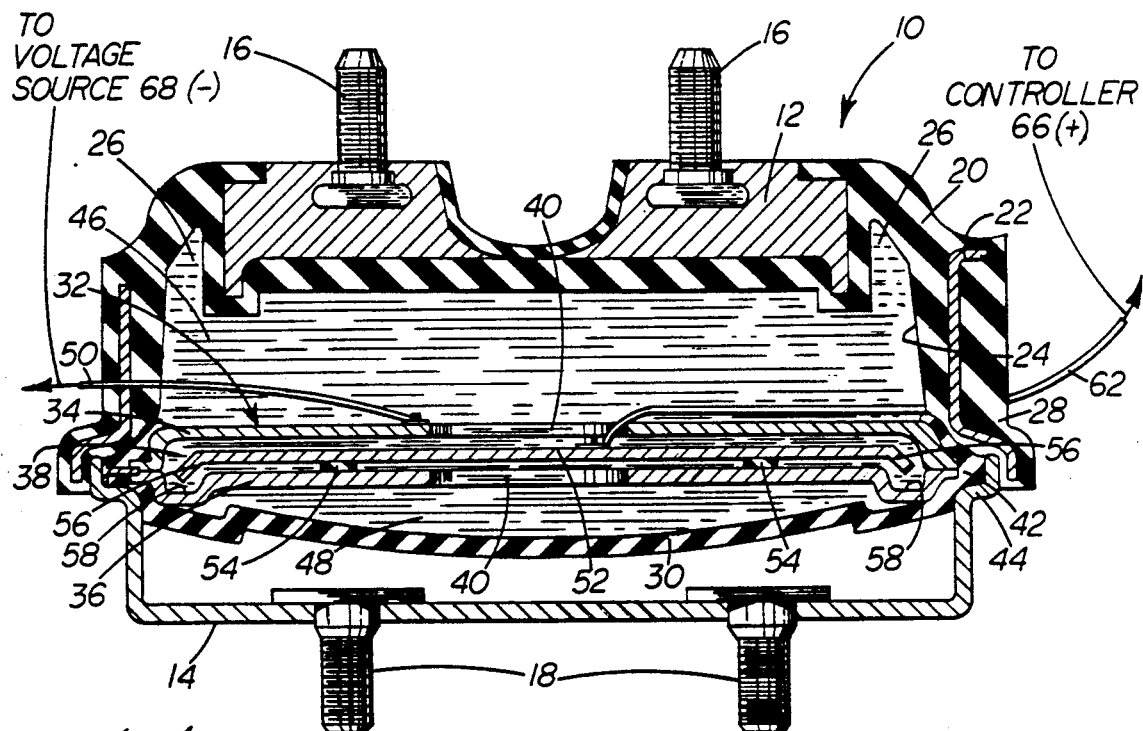
FIG. 1 is a cross-sectional view of the hydraulic mount assembly of the present invention.

Referring to the drawing, and particularly to FIG. 1, there is a showing of the present preferred embodiment in the form of an improved hydraulic elastomeric mount assembly 10. This mount assembly is particularly adapted for mounting a component, such as an internal combustion engine or transmission to the frame of a vehicle. The mount assembly 10 can, of course, be used in applications other than engine or transmission mounts, where controlled damping of vibration is desired especially with a reduced damping action at low amplitudes and higher frequencies.

The mount assembly shown in FIG. 1 includes a cast metal mounting member 12 and a stamped sheet metal mounting member 14. The mounting members 12 and 14 each include a pair of mounting studs 16, 18 respectively. The studs 16 and 18 project outwardly from the mounting members 12 and 14 for attachment respectively to an engine and an engine supporting cradle or frame member of a vehicle.

A hollow, flexible body 20 interconnects the mounting members 12, 14. The body 20 is constructed of an elastomeric material, such as natural or synthetic rubber. More specifically, the body 20 may be molded to and about the mounting member 12 and includes an imbedded stamped sheet metal retainer 22.

The body 20 defines a hollow cavity 24 for receiving a damping liquid. Oppositely located voids 26 formed between the mounting member 12 and the retainer 22 provide some directional, dynamic rate control. In accordance with the specific aspects of the present invention, this damping liquid is an electro-rheological fluid. Such a fluid changes viscosity when exposed to an electrical potential field. The change is substantially instantaneous and is linearly dependent on the strength of the field.

Electro-rheological fluids are oil-based fluids of a normally low viscosity. Small polymer grains are added to the fluids. These grains have a very thin coating of ordinary water. The behavior of the electro-rheological fluid in the absence of a polarizing electric field is that of a normal, low viscosity, incompressible, hydraulic oil. However, the very thin water film on the polymer grains is polarized due to the strong polarity of the water molecule itself. Accordingly, in the presence of a strong electrical voltage field, the grains of water-coated polymer align themselves with the voltage field and tend to stick to each other The end effect of the particular alignment and adhesion in the presence of an electrical potential field is that the fluid viscosity increases. Electro-rheological fluids are described, for example, in U.S. Pat. Nos. 4,033,892 and 4,129,513 both to Stangroom. Such fluids are also available from various manufacturers, such as sold under the trademarks Lubrizol and Mobay.

Together, the mounting member 12, elastomeric body 20 and metal retainer 22 form a first subassembly or cover of the mount assembly 10. The retainer 22 includes an outwardly projecting collar 28 at its lower periphery. The collar 28 is formed to receive a second subassembly or base. The base comprises the mounting member 14, and elastomeric diaphragm 30 and a partition 32. The partition 32 includes two outer plates; i.e. an upper plate 34 and a lower plate 36 form an intermediate chamber or cell 38. Additionally, each of the plates includes an enlarged, central flow orifice 40 for the passage of the electro-rheological fluid.

The elastomeric diaphragm 30 also includes an annular rim portion 42 having a peripheral groove formed between the upper and lower shoulders respectively. The shoulders are flexible so as to receive the outer edge of the plates 34, 36 of the partition 32. Thus, the partition 32 is sealingly engaged by the shoulders on opposite sides of the groove.

The mounting member 14 is formed with a collar 44 to receive the rim portion 42 of the diaphragm 30. The collar 44 of the member 14 fits within the collar 28 of the retainer 22. As is known in the art, tabs (not shown) may be provided on the collar 28 and bent over to retain and seal the whole mount assembly.

The elastomeric diaphragm 30 closes the elastomeric body 20 so as to form therewith the closed overall damping cavity 24. This cavity 24 is divided by the partition 32 into a primary chamber 46, enclosed by the elastomeric body 20; the intermediate cell 38, enclosed by the outer (upper and lower) plates 34, 36; and a secondary chamber 48, enclosed by the diaphragm 30.

The upper and lower plates 34, 36 of the partition 32 are formed of a conductive material, such as a steel alloy or copper. The plates 34, 36 are preferably connected to ground potential. Such a connection may be completed by means of the conductor 50. As shown, the conductor 50 connects the plates 34, 36 to the negative terminal of the voltage source 68, such as the battery/generator, or simply to the frame of the vehicle.

An intermediate plate 52, also formed of a conductive metal such as steel alloy or copper, is positioned within the cell 38 between the outer partition plates 34, 36. More particularly, the intermediate plate 52 is mounted on a series of pads 54 formed of insulating material secured, for example, to the lower plate 36.

As shown in FIG. 1, the intermediate plate 52 preferably includes a skirt 56 around the outer marginal edge. This skirt 56 extends around the entire periphery of the plate so that the intermediate plate 52 assumes a domed configuration.

In order to accommodate the skirt 56, the lower plate 36 includes a corresponding continuous peripheral channel 58. As shown, the skirt 56 extends into the channel so that the distance between the intermediate plate 52 and the upper and lower plates 34, 36 is substantially the same over the entire surface of the intermediate plate.

Figure 2:
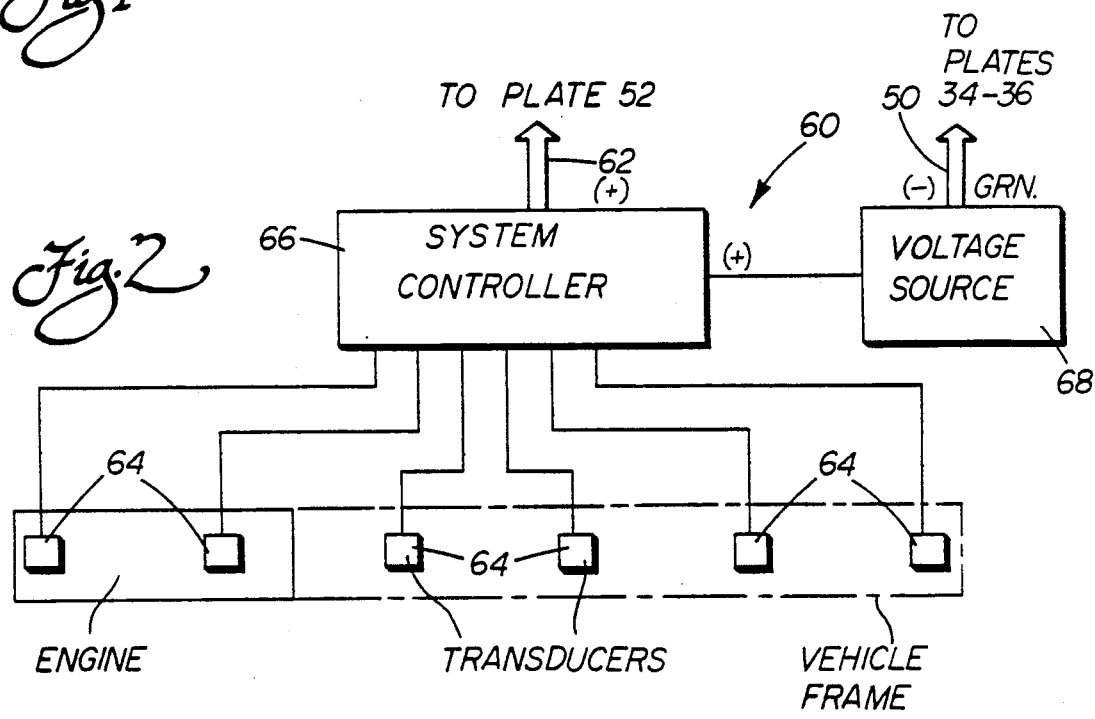
FIG. 2 is a schematic representation of the control circuit of the present invention.

As shown in FIGS. 1 and 2, the intermediate plate 52 is connected to the positive voltage source of a control circuit 60 by means of a conductor 62. The control circuit 60 includes a plurality of vehicle mounted transducers 64 and an analog-type system controller 66 of a type known in the art. Preferably, the system controller 66 takes the form of a microprocessor operating in the control circuit 60 to infinitely vary or fine tune the characteristics of the mount assembly to sensed vehicle operating conditions and vibrations.

For example, during engine idling the engine undergoes small amplitude vibrations. These vibrations are detected by the transducers 64 which send appropriate signals to the system controller 66. In response to the sensed input signals, the system controller 66 produces a control signal resulting in the application of minimum or no voltage potential across the intermediate and partition plates 52 and 34, 36, respectively. As a result, the rheological fluid viscosity remains low. Thus, the fluid passes relatively freely through the flow orifices 40 and around the intermediate plate 52 between the primary and secondary chambers 46, 48 respectively. As a result, damping action is minimized and the mount exhibits relatively soft characteristics that effectively isolate engine vibrations.

As a vehicle is put under a load, such as upon acceleration from a standing position, engine vibrations increase. Increased vibrations are sensed by the transducers 64 and an appropriate signal is sent from the transducers to the system controller 66. The system controller 66 acts in response to the increased vibrations and produces a control signal which results in the application of an increased voltage potential across the intermediate plate 52 and the upper and lower plates 34, 36 of the partition 32. The voltage potential is varied proportionally so as to increase with increasing vibrations. In this way, the viscosity of the rheological fluid within the cell 38 between the intermediate plate 52 and upper and lower plates 34, 36 is increased. Accordingly, the friction of this fluid as it flows through the cell 38 around the intermediate plate 52 and outwardly through the flow orifices 40 into either the primary or secondary chambers 46, 48 is increased. Thus, the damping provided by the mount 10 is effectively infinitely variable so as to match the operating characteristics of the engine and provide the desired balance between vibration isolation and control of engine movements. Additionally, smooth transitions between soft and hard characteristics are assured so as to provide better overall performance and smoother characteristics for increased operator and passenger satisfaction.

It should also be appreciated that the system of the present invention operates at markedly improved efficiency. More particularly, the desired changes in the viscosity of the fluid may be obtained at relatively low voltage potential levels of 1,000 volts per millimeter of gap between the intermediate plate 52 and the upper and lower plates 34, 36. For most applications, even lower voltage levels may be used. The efficient level of operation is provided by a number of unique features of the invention including the enveloping of the intermediate plate 52 with the outer (ground potential) plates 34, 36. Additionally, it should be appreciated that the skirt 56 of the intermediate plate 52 forms a dome providing increased surface area to increase the effectiveness of the electro-fluid action. The skirt also cooperates with the corresponding continuous channel 58 in the partition plate 36 to provide equal spacing so that the effect of the electrical charge is the same over the entire surface area. The skirt 56 and the channel 58 also forms a tortuous pathway for directing the flow of the electro-rheological fluid. This pathway effectively provides a fluid churning effect that further maximizes the contact area of the plates 52, 34, 36 with the fluid. It also serves to intensify the damping effect created by increases in the viscosity of the fluid so that the entire system operates in a more efficient and effective manner.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A hydraulic mount assembly, comprising:
   a pair of mounting members;
   a hollow body connected to said mounting members;
   a resilient diaphragm closing said hollow body and forming therewith a closed cavity that is filled with an electro-rheological fluid;
   means for partitioning said cavity into a primary chamber and a secondary chamber enclosed by said diaphragm, said partitioning means including upper and lower conductive plates defining a cell therebetween, each plate further including a fluid flow orifice connecting said chambers through said cell so as to effect damping;
   a substantially continuous, conductive intermediate plate mounted in said cell between said upper and lower plates;
   insulated mounting means upon which said intermediate plate is mounted to said partitioning means; and
   means for applying a voltage to said electro-rheological fluid across said intermediate plate and said partitioning means including said upper and lower plates so as to selectively vary viscosity of said fluid and thus the damping of said hydraulic mount assembly.

2. A hydraulic mount assembly, comprising:
   a pair of mounting members;
   a hollow body connected to said mounting members;
   a resilient diaphragm closing said hollow body and forming therewith a closed cavity that is filled with an electro-rheological fluid;
   means for partitioning said cavity into a primary chamber and a secondary chamber enclosed by said diaphragm, said partitioning means including upper and lower conductive plates defining a cell therebetween, each plate further including a fluid flow orifice connecting said chambers through said cell so as to effect damping;

a substantially continuous, conductive intermediate plate having a peripheral skirt around the marginal edge so as to form a dome shape, said intermediate plate being insulatingly mounted in said cell between said upper and lower plates; and means for applying a voltage to said electro-rheological fluid across said intermediate plate and said upper and lower plates so as to selectively vary viscosity of said fluid and thus the damping of said hydraulic mount assembly.

3. The hydraulic mount assembly disclosed in claim 2 wherein one of said upper and lower plates of said partitioning means includes a substantially continuous channel, said skirt of said intermediate plate extending toward said channel so as to define a tortuous pathway for electro-rheological fluid flow.

* * * * *